Nov. 11, 1958 L. A. COHN 2,859,519
DENTAL RETRACTOR AND SALIVA EJECTOR
Filed March 15, 1957 2 Sheets-Sheet 1
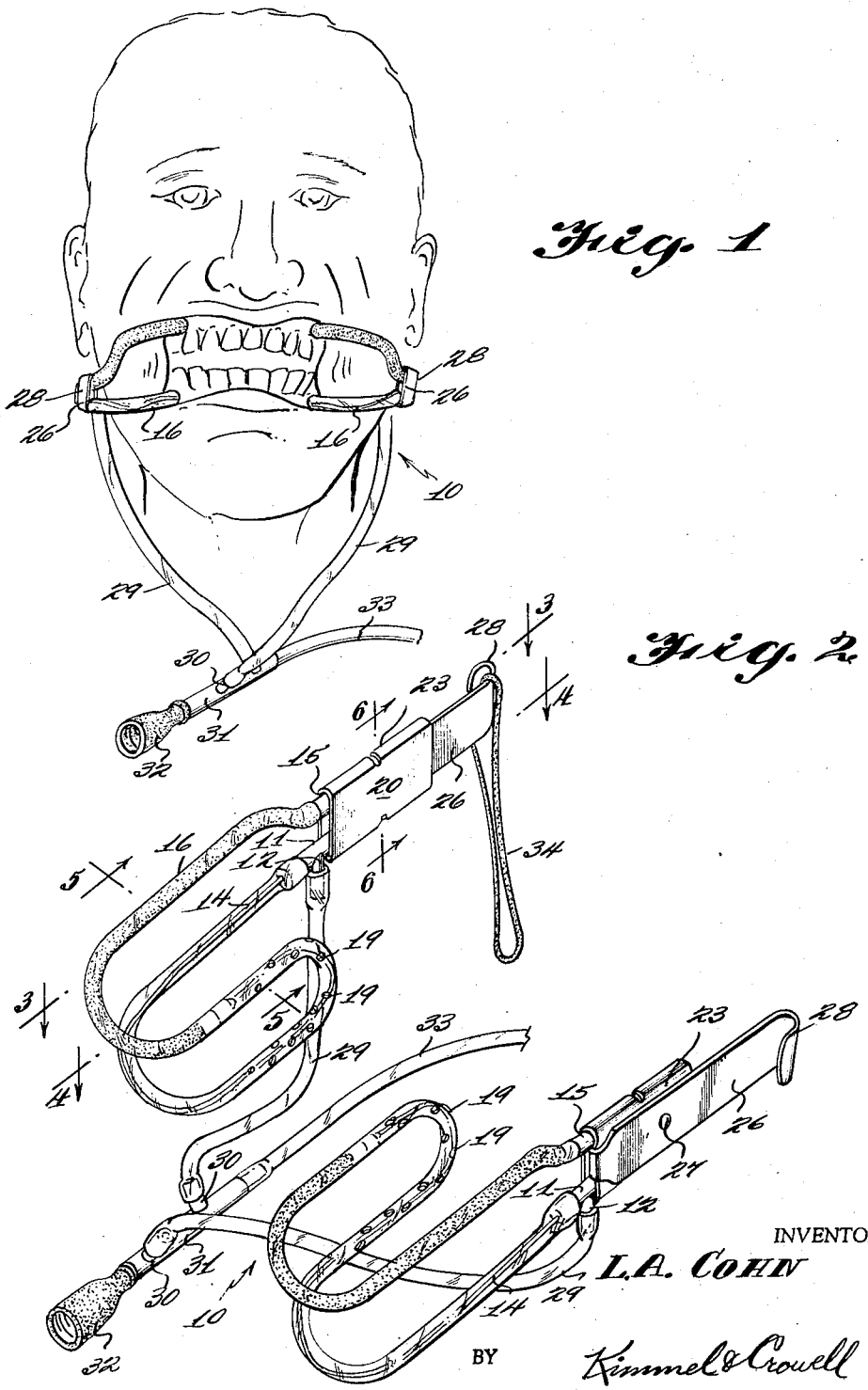
INVENTOR
L.A. COHN
BY
Kimmel & Crowell
ATTORNEYS

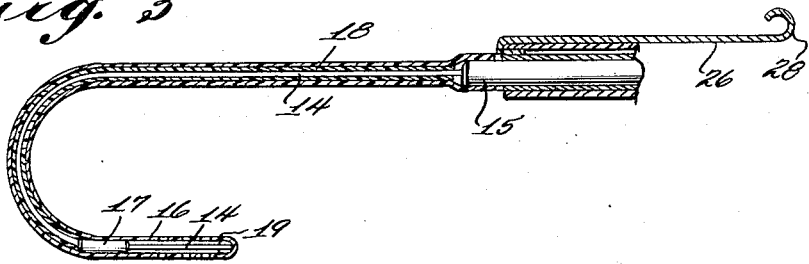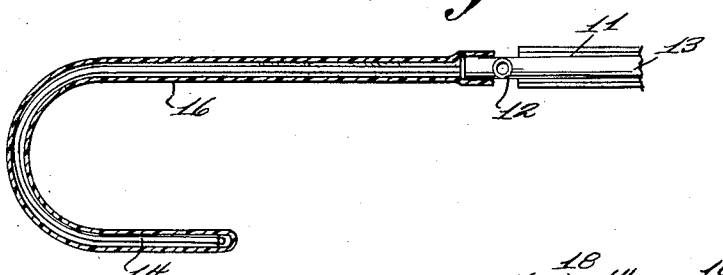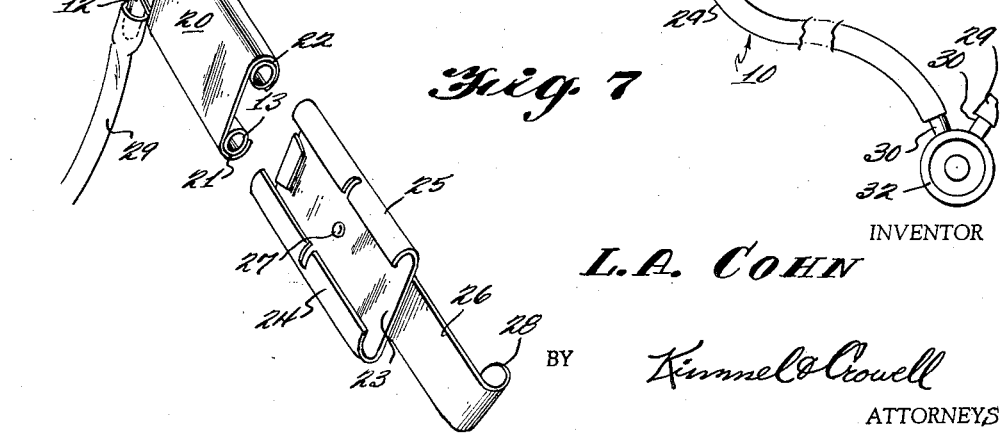

United States Patent Office 2,859,519
Patented Nov. 11, 1958

2,859,519

DENTAL RETRACTOR AND SALIVA EJECTOR

Louis A. Cohn, Ossining, N. Y.

Application March 15, 1957, Serial No. 646,308

4 Claims. (Cl. 32—33)

The present invention relates to dental retractors and saliva ejectors for maintaining an open dry field for dental operations.

The primary object of the invention is to provide a dental retractor for permitting access to the teeth while acting as a saliva ejector to maintain a dry field during the dental operation.

Another object of the invention is to provide a device of the class described above which can be adjustably secured to the head of the patient.

A further object of the invention is to provide a device of the class described above having means associated therewith for connection of the device to the conventional source of suction.

A still further object of the invention is to provide a device of the class described above which is easy to clean, inexpensive to manufacture, and simple to use.

Other objects and advantages will become apparent in the following specification when considered in the light of the attached drawings, in which:

Figure 1 is a perspective view of the invention shown in position on the head of a patient.

Figure 2 is a perspective view of the invention shown removed from the patient's mouth.

Figure 3 is an enlarged fragmentary longitudinal cross-section taken along the line 3—3 of Figure 2, looking in the direction of the arrows.

Figure 4 is an enlarged fragmentary longitudinal cross-section taken along the line 4—4 of Figure 2, looking in the direction of the arrows.

Figure 5 is an enlarged fragmentary transverse cross-section taken along the line 5—5 of Figure 2, looking in the direction of the arrows.

Figure 6 is an enlarged fragmentary transverse cross-section taken along the line 6—6 of Figure 2, looking in the direction of the arrows.

Figure 7 is a fragmentary exploded perspective view of a construction detail of the invention.

Referring now to the drawings in detail wherein like reference numerals indicate like parts throughout the several figures, the reference character 10 indicates generally a combined dental retractor and saliva ejector constructed in accordance with the invention.

The combined retractor and saliva ejector 10 includes a metallic tubular member 11 having a branch 12 extending laterally therefrom. The tubular member 11 is formed of metal and has the end 13 thereof sealed. A rod 14 formed of malleable material is supported in the tubular member 11 and extends therefrom.

A second tubular member 15 is positioned in closely spaced parallel relation to the tubular member 11 and supports the opposite end of the malleable member 14. A plastic tube 16 is engaged over the end of the tubular member 11 in encompassing relation to the malleable rod 14 and has its opposite end supported on the tubular member 15.

A seal 17 is carried by the malleable rod 14 within the tubular member 16, to form a limit to the opening of the tube 16. A cover 18 extends from the seal 17 to the tubular member 15 in surrounding relation to the malleable rod 14.

The tubular member 16 is perforated at 19 in the longitudinal center area thereof. The malleable rod 14 and the tubular member 16 are formed in a generally U-shaped relation with the bight thereof reverted to form an open hook, as best illustrated in Figure 2. Due to the malleability of the rod 14, the U-shaped relation of the tubular member 10 can be readily adjusted to fit the patient and adjust the jaw opening.

A plate 20 is provided with a pair of socket members 21 and 22, respectively, along the opposite side edges thereof encompassing, respectively, the tubular members 11 and 15. A clamping plate 23 is provided with sockets 24 and 25 along the opposite side edges thereof for encompassing the sockets 21 and 22, respectively, of the plate 20. The plate 20 can be adjusted horizontally with respect to the tubular members 11 and 15 to adjust the overall length of the ejector 10. The plate 20 can be snapped over the tubular members 11 and 15 when assembling the device.

An elongated extension 26 is secured to the clamping plate 23 by a securing element 27. An outwardly reverted hook 28 is formed on the outer end of the elongated extension 26, for reasons to be assigned.

A pair of flexible plastic tubes 29 each have one end connected to one of the branches 12 of the tubular members 11 and the opposite end thereof connected to one of the branches 30 of a tubular member 31. A connector 32 extends from one end of the tubular member 31 for coupling the tubular member 31 to a source of vacuum.

The saliva ejector illustrated and described in my copending application, filed simultaneously herewith, may be used in conjunction with the combined retractor and saliva ejector described above, and in such cases the tube 33 connected to one end of the tubular member 31 will extend to the aforementioned saliva ejector.

In the use and operation of the invention, the tubular member 16 and the malleable rod 14 are formed by hand to fit the mouth of a patient and are engaged between the teeth and the cheeks to hold the cheeks out of contact with the teeth.

Suction from the vacuum member to which the fitting 32 is connected applies a vacuum through the apertures 19 in the tube 16 to eject saliva from the dental operation field. This provides both a clear field insofar as vision is concerned as well as a dry field to facilitate the dental operation.

The combined retractors and ejectors 10 are engaged on opposite sides of the mouth of the patient and secured in place by means of a rubber band 34 engaged in the hooks 28 and passing behind the head of the patient. It should be understood that the retractors 10 can have the angle thereof adjusted by raising and lowering the position of the rubber band 34 on the rear of the head of the patient.

Having thus described the preferred embodiment of the invention, it should be understood that numerous structural modifications and adaptations may be resorted to without departing from the scope of the appended claims.

What is claimed is:

1. A combined ejector and retractor of the class described comprising a malleable rod, a flexible tube encompassing said rod, means supporting the opposite ends of said rod and the opposite ends of said tube, said tube having apertures formed intermediate the opposite ends thereof, said tube and said rod being formed into a pair of integrally connected spaced parallel hooks for retracting engagement with a mouth, means connecting said tube to a source of suction for ejecting saliva from the mouth, and means extending behind the head of a patient for securing said ejector and retractor to the head of a patient with said ejector and retractor in position in the patient's mouth.

2. A device as claimed in claim 1 wherein the means supporting said rod and said tube comprises a pair of spaced tubular members, means supporting said spaced tubular members in parallel relation, and a clamping plate engaging over said last named means and carrying a hook thereon for engagement with the means supporting said ejector and retractor to the head of a patient.

3. A device as claimed in claim 1 wherein said tubular member is provided with a seal intermediate the ends thereof.

4. A device as claimed in claim 1 wherein said tubular member and said malleable rod are detachably connected to the means supporting the opposite ends thereof whereby they may be removed for cleaning and sterilizing thereof.

References Cited in the file of this patent

UNITED STATES PATENTS

| | | |
|---|---|---|
| 1,012,613 | De Witt | Dec. 26, 1911 |
| 1,471,207 | Riddle | Oct. 16, 1923 |
| 2,028,381 | De Witt | Jan. 21, 1936 |